United States Patent [19]

Baker et al.

[11] Patent Number: 4,973,622

[45] Date of Patent: Nov. 27, 1990

[54] VINYL CHLORIDE-OLEFIN COPOLYMERS HAVING GOOD COLOR STABILITY AND FLEXIBILITY FOR CONTAINER COATINGS

[75] Inventors: John A. Baker, Allison Park; Rudolf Maska, Pittsburgh; James R. Bodwell, Pittsburgh; Suryya K. Das, Pittsburgh; Jerome A. Seiner, Pittsburgh, all of Pa.; Terence J. Hart, Powell, Ohio

[73] Assignee: PPG Industries, Inc., Pittsburgh, Pa.

[21] Appl. No.: 517,888

[22] Filed: May 2, 1990

Related U.S. Application Data

[62] Division of Ser. No. 328,990, Mar. 27, 1989, Pat. No. 4,948,834.

[51] Int. Cl.$^5$ .................... C08L 27/00; B32B 27/00
[52] U.S. Cl. .................... 524/567; 524/581; 428/500
[58] Field of Search ............... 524/567, 581; 428/500

*Primary Examiner*—Joseph L. Schofer
*Assistant Examiner*—Mark Sweet
*Attorney, Agent, or Firm*—Godfried R. Akorli

[57] ABSTRACT

Disclosed herein is an improved vinyl chloride latex copolymer composition having good color stability, characterized in that it contains a small but effective amount of an alpha-olefin to provide color stability of films of the composition.

3 Claims, No Drawings

VINYL CHLORIDE-OLEFIN COPOLYMERS HAVING GOOD COLOR STABILITY AND FLEXIBILITY FOR CONTAINER COATINGS

This is a divisional of application Ser. No. 07/328,990, filed Mar. 27, 1989 now U.S. Pat. No. 4,948,834.

BACKGROUND OF THE INVENTION

1. Field of the Invention

The present invention relates to vinyl chloride latex copolymers. More specifically, the present invention relates to vinyl chloride copolymers employing small but effective amounts of ethylene comonomer.

2. Brief-Description of the Prior Art

Vinyl chloride latex copolymers are generally known in the art. These copolymers are advantaged by color, clarity, flexibility, and barrier properties. These properties make the vinyl chloride latex copolymers well suited to use in plastics and surface coatings. Premature failure of some of the above properties under processing or service conditions of products containing the vinyl chloride latex copolymers is, however, of concern. Of particular concern here is the problem of discoloration of coatings containing vinyl chloride latex copolymers upon baking at high temperatures of about 350° F. or higher. In order to avoid or prevent discoloration at the bake temperatures, stabilizers, such as organotin compounds and certain metal carboxylates, are often added to the coating.

By the present invention, there is provided a novel class of vinyl latex copolymers wherein discoloration at bake temperatures is prevented or reduced. Notably, the new class of vinyl latex copolymers display yet other improved properties, which are discussed more fully herein.

SUMMARY OF THE INVENTION

In accordance with the foregoing, the present invention encompasses an improved vinyl halide latex copolymer composition having color stability, containing a latex copolymer of free-radical addition polymerizable ethylenically unsaturated monomers in water in the presence of a polymeric surfactant; the improvement comprising a copolymerizable alpha-olefin monomer selected from the group consisting of ethylene, propylene, isobutylene, and butene-1 which is present in a small but effective amount to reduce or prevent discoloration of a film of the vinyl halide latex copolymer composition, upon baking at a temperature of about 350° F. or higher. In the present embodiment of the invention, the vinyl halide monomer is vinyl chloride, and the alpha-olefin is ethylene in amounts of about 1 to 4 percent by weight solids based on the total weight of the copolymerized monomers of the latex copolymer. The term "latex copolymer" is used to refer to the copolymerized monomers in the dispersed phase. The term "latex copolymer composition" is used to refer to the final composition comprising the latex copolymer and polymeric surfactant(s).

The invention further encompasses a coating composition, particularly a water-based coating composition containing the vinyl halide latex copolymer composition of this invention and a method of using the same to reduce discoloration of coated substrates. Also encompassed by the invention is an article of matter which is prepared by applying the coating composition of this invention to a substrate such as an aluminum substrate.

The article of matter of this invention exhibits reduction or prevention of discoloration when a film of the coating composition is baked at a temperature of about 350° F. or higher. In the preferred embodiment, the baked coatings are notably coalesced and, of course, have the additional properties, principal among which is freedom from taste. Hence, the coating compositions of this invention are very well suited to use as interior can coatings.

DETAILED DESCRIPTION OF THE INVENTION

The vinyl halide latex copolymer of this invention is principally of a vinyl halide and an alpha-olefin content wherein the alpha-olefin is characterized in that it is present in small but effective amounts to reduce or prevent discoloration of a film of the latex copolymer composition. The alpha-olefin content can be from about 0.5 to 6 percent and preferably about 1 to 4 percent by weight solids based on the monomer content of the latex copolymer. The vinyl halide content of the copolymer can be from about 75 to 99.5 percent and preferably about 90 to 99 percent by weight solids based on the copolymerized monomer content of the latex copolymer.

In a preferred embodiment of the invention, the vinyl halide latex copolymer further contains a copolymerized epoxy-containing monomer. An example of said monomer can be glycidyl acrylate, glycidyl methacrylate, allyl glycidyl ether or the like. The epoxy-containing monomer can be employed in amounts of about 0.5 to 20 percent and preferably about 0.5 to 4 percent by weight solids of the copolymerized monomer content of the latex copolymer.

In the process of this invention, the latex copolymer composition can be prepared by a free-radical initiated addition polymerization of the monomers described hereinabove in water in the presence of a surfactant, which is preferably a polymeric surfactant such as a base-neutralized acid-functional addition polymer.

It is a distinct feature of the invention that relatively low amounts of alpha-olefin are employed herein. Copolymerization reactions of alpha-olefin, such as ethylene, is usually performed under pressure. As would be realized, when a low amount of ethylene is employed, the applied pressure is easily manageable. Hence, there is provided hereby an improved process for preparing a copolymer of vinyl halide at a reduced pressure.

It is also a distinct feature of the invention that substantially high amounts of the vinyl halide monomer can be employed herein. By using high levels of, say, vinyl chloride, the benefits associated with this monomer can be maximized. The cost of the resultant copolymer can be reduced since the vinyl chloride monomer is relatively inexpensive.

The method of preparing the latex copolymer composition is described hereinbelow. The preferred polymeric surfactant, which is useful herein, can be a base-neutralized acid-functional acrylic polymer. The base-neutralized acid-functional acrylic polymer is prepared by free-radical addition polymerization of ethylenically unsaturated monomers at least one of which is an acid-functional monomer which is preferably an acrylic acid or methacrylic acid. Other acids or equivalents thereof that are useful herein can be itaconic acid, maleic acid, fumaric acid, monoesters of unsaturated dicarboxylic acids, e.g., methyl hydrogen maleate and ethyl hydrogen fumarate as well as anhydrides thereof where they exist, can also be used. Other monomers can be copolymerized herein provided that the copolymerizable monomer does not adversely affect the preparation or use of the final product.

The acid-functional monomer is employed in an amount of about 40 to 100 percent and preferably about 50 to 90 percent by weight based on the total monomer content of the acid-functional acrylic polymer. The molecular weight (Mw) of the acid-functional addition polymer can be from about 3,000 to 100,000 and preferably from about 10,000 to 80,000 based on polystyrene standards.

The acid-functional addition polymer is neutralized with a base which is preferably a fugitive base. The degree of neutralization can be from about 0 to 100 and preferably about 30 to 80 percent. Suitable bases include ammonia and primary, secondary or tertiary amines, e.g., ethanolamine, diethanolamine, N-methylethanolamine, dimethylethanolamine, isopropanolamine, diisopropanolamine, methylamine, ethylamine, diethylamine, trimethylamine, triethylamine and morpholine.

The latex copolymer composition can be prepared by free-radical initiated addition polymerization of the vinyl monomer and alpha-olefin in the presence of a surfactant. On a percent basis, the base-neutralized acid-functional polymeric surfactant can be employed in amounts of about 5 to 90 percent and preferably about 5 to 55 percent based on total resin solids of the latex copolymer composition. The polymeric surfactant can be used in combination with conventional surfactants such as ionic or nonionic surfactants. As aforestated, the vinyl monomer, alpha-olefin monomer can be copolymerized with an epoxy-containing monomer. Yet, other copolymerizable monomers can be employed herein provided that the preparation and use of the latex copolymer is not adversely affected.

Thermal or redox free-radical initiators which can be used in the preparation of the latex copolymer can be water-soluble or oil-soluble initiators such as peroxide-types, e.g., hydrogen peroxide, t-butyl hydroperoxides-/isoascorbic acid; ionic types, e.g., ammonium, sodium or potassium persulfates or azo types, e.g-.,azobisisovaleronitrile; azobis(N,N'dimethyleneisobutyl)amidene. Typically, there are employed in amounts of about 0.01 to 3 percent and preferably about 0.05 to 1 percent of the initiator based on the weight of the copolymerizable monomers.

The polymerization temperatures employed herein can be from about 25° C. to 90° C. and preferably from about 40° C. to 75° C. Depending on how much ethylene is added herein, the reactor pressure can be from about 80 to 400 pounds per square inch gravity (psig) and preferably from about 170 to 350 psig. The resultant latex copolymer composition has a solids content of about 20 percent or higher and typically up to about 40 percent and particle size of 500 to 5,000 angstroms and viscosity of about 10 to 10,000 centipoises.

In the practice of this invention, the latex copolymer composition can be employed in coating compositions in an amount sufficient for the intended use. In interior can coatings, for example, the latex copolymer composition should be present in an amount sufficient to provide barrier properties and other desirable fabrication and durability properties. The coating composition can contain curing agents such as aminoplasts, phenoplasts or isocyanates. The curing agent is employed in amounts sufficient to produce the requisite degree of crosslinking.

Aminoplast resins are the condensation products of an aldehyde, e.g., formaldehyde, acetaldehyde, crotonaldehyde, and benzaldehyde with an amino or amide group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141, Porter et al, Feb. 21, 1978, contains a description of useful aminoplast resins and is incorporated herein by reference.

Phenolic resins include the condensation product of an aldehyde with a phenol. Formaldehyde and acetaldehyde are preferred aldehydes. Various phenols can be used, e.g., phenol per se, reseol, p-phenylphenol, p-tert-butylphenol, p-tert-amylphenol and cyclopentylphenol. The methylolphenol ethers described in U.S. Pat. No. 2,597,333 (herein incorporated by reference) are especially useful.

A number of blocked polyisocyanates are satisfactory crosslinking agents. These agents are well known in the art. Generally, the organic polyisocyanates are blocked with a volatile alcohol, epsilon-caprolactas, or ketoxime. These blocked polyisocyanates become unblocked at elevated temperatures, e.g., above about 100° C. "The Chemistry of Organic" Film Formers", Robert E. Kreiger Pub. Co., copyrighted 1977, by D. H. Solomon, pages 216-217, contains a description of many blocked isocyanates that can be used here. The disclosure of this publication is herein incorporated by reference.

Also contained in the coating compositions can be additives such as flow control agents, adhesion promoters, cure catalysts and the like. The coating compositions of this invention can be prepared by blending the latex copolymer, the curing and other coating additives, and adjuncts thoroughly. The coatings can be cured by baking at temperatures of 300° F. to 500° F. to commercial quality coatings having color stability.

The coating composition can be applied to substrates such as aluminum or steel by spraying, roll coating, and electrodeposition method. The article of matter comprising the cured coated substrates are characterized by the properties, principal among which are color stability barrier properties, adhesion, and impact resistance.

These and other properties are more fully illustrated by the following non-limiting examples.

EXAMPLE 1

This example illustrates the vinyl chloride latex copolymer compositions of this invention and a method of preparing and using the same.

| Ingredients | Parts by Weight (grams) |
|---|---|
| Reactor charge | |
| Acid-functional acrylic polymer surfactant[1] | 623.0 |
| Ammonium persulfate } mix | 4.4 |
| Deionized water } mix | 50.0 |
| Deionized water } mix | 2090.0 |
| Monomer Charge (MC)[2] | |
| Vinyl chloride | 915.0 |

-continued

| Ingredients | Parts by Weight (grams) |
| --- | --- |
| Glycidyl methacrylate | 20.0 |

[1] Acrylic acid, 40 percent; styrene, 59 percent; ethyl acrylate, 1 percent on a weight basis.
[2] Prepared by blowing the glycidyl methacrylate into the vinyl chloride over five minutes at 100 revolutions per minute (rpm).

The polymerization was conducted in a sealed reactor equipped with an agitator, a means for heating, cooling and a means for purging with an inert gas.

The reactor charge was added to the reactor which was then subjected to vacuum. The reactor charge was then subjected to stirring at 300 rpm. One hundred ten grams of the monomer charge was added to the reactor charge with stirring at 300 rpm at a maximum rate and at a pressure of 40 psig at room temperature. An addition of ethylene to the reactor charge was commenced and continued until a pressure of 219.4 psig was achieved at room temperature; the reactor charge was being stirred at 300 rpm. The reactor charge was then heated to 75° C, a pressure of 259.5 psig was attained at that temperature. The reaction mixture was held at 75° C. for about one hour until the pressure began to drop. After one hour, the pressure dropped to 240.9. At that time, the monomer feed to the reactor was commenced and continued for over two hours at the rate of 3.3 grams per liter. The reaction mixture was held for three more hours at 75° C. with stirring at 300 rpm with the pressure dropping to 221.6. During the holding period, samples were taken and evaluated for one-hour intervals of solids content. After the holding period, the resultant product was cooled and analyzed: milliequivalents of acid was 0.24; milliequivalents of base was 0.127; particle size was 7590 angstroms, and solids content was 24.02 percent.

EXAMPLE 2

This example further illustrates the vinyl chloride latex copolymer compositions of the invention.

| Ingredient | Parts by Weight (grams) |
| --- | --- |
| Reactor Charge | |
| Deionized water | 500.0 |
| Ammonium persulfate | 4.5 |
| Triton N 101[1] | 15.5 |
| PMF Charge | |
| Salt of acid-functional acrylic polymer[2] | 742.5 |
| Deionized water | 1697.0 |
| Glycidyl methacrylate | 16.9 |
| Vinyl Chloride Monomer (VCM) Charge | |
| Vinyl chloride | 742.5 |

[1] Nonyl phenoxy polyethylene oxy ethanol (65% ethylene oxide).
[2] 40 percent acrylic acid; 59 percent styrene; 1 percent ethyl acrylate (all on a weight basis).

The reactor charge was charged to the reactor which vacuumed and set at an agitation rate of 275 rpm. The PMF charge was added to the reactor which was again subjected to vacuum at a set agitation rate of 200 rpm. 335.6 grams of the PMF charge and 111.4 grams of the VCM charge were added to the reactor (at 270.9 rpm) at a pressure of 37.9.

The reactor (at 273.1 rpm) was pressurized at 148 psig in order to introduce ethylene therein. The reactor charge was heated to 75° C. and held for 20 minutes at 237 psig. The remainder of PMF charge and the VCM charge were added to the reactor, respectively at the rates of 633.8 grams per hour and 210.4 grams per hour for three hours. Upon completion of the addition, the reaction mixture was held for two hours at 75° C. with the pressure dropping with 277.2 psig to 173.7 psig.

The resultant mixture was analyzed: milliequivalents of acid was 0.226; milliequivalents of base was 1.53; particles size was 1260 angstroms and solids content was 25.2 percent.

Curable coating composition of this invention were prepared with vinyl latex copolymer compositions described herein, melamine formaldehyde resins as curing agents and other resinous adjuncts and additives typically found in internal can coatings. The coating compositions were applied with a No. 12 drawdown bar and baked at 400° F. for four minutes. The cured coatings showed significantly reduced discoloration.

Therefore, what is claimed is:

1. A coating composition containing a vinyl halid latex copolymer composition having color stability, containing a copolymer of free-radical addition polymerizable ethylenically unsaturated monomer in water, in the presence of a polymeric surfactant; the improvement comprising a copollymerizable alpha-olefin monomer selected from the group consisting of ethylene, propylene, isobutylene and butene-1, which is present in a small but effective amount to reduce or prevent discoloration of a film of the vinyl halide latex copolymer composition upon baking at temperature of about 350° F. or higher.

2. A coating composition of claim 1 which further comprises a curing agent which is an aminoplast, phenoplast or isocyanate.

3. An article of matter which is prepared by applying to a substrate the coating composition of claim 2.

* * * * *